United States Patent [19]

Takizawa et al.

[11] 4,452,863
[45] Jun. 5, 1984

[54] MAGNETIC RECORDING MEDIUM

[75] Inventors: Masahiro Takizawa, Saku; Yoshio Kawakami, Toubu; Noribumi Kajimoto, Saku, all of Japan

[73] Assignee: TDK Electronics Co., Ltd., Tokyo, Japan

[21] Appl. No.: 388,053

[22] Filed: Jun. 14, 1982

[30] Foreign Application Priority Data

Jun. 19, 1981 [JP] Japan ................... 56-94013

[51] Int. Cl.$^3$ ............................................. G11B 5/70
[52] U.S. Cl. ........................... 428/423.1; 360/134; 360/135; 360/136; 427/128; 427/131; 428/423.7; 428/480; 428/694; 428/695; 428/900
[58] Field of Search ............. 428/695, 900, 692, 694, 428/423.1, 423.7, 480; 427/128, 131; 360/134–136

[56] References Cited

U.S. PATENT DOCUMENTS

| | | | |
|---|---|---|---|
| 3,993,824 | 11/1976 | Shirahata | 428/900 |
| 4,115,290 | 9/1978 | Kubota et al. | 252/62.54 |
| 4,189,514 | 2/1980 | Johnson | 428/331 |
| 4,322,474 | 3/1982 | Matsuura et al. | 427/128 |
| 4,367,261 | 1/1983 | Miyoshi | 428/694 |

Primary Examiner—Ellis P. Robinson
Attorney, Agent, or Firm—Seidel, Gonda & Goldhammer

[57] ABSTRACT

In a magnetic recording medium having a base, a coating for magnetic recording formed on one side of the base, and a back coating of a nonmagnetic powder dispersed in a binder containing a thermosetting resin and formed on the other side, the back coating contains a fatty acid and/or a fatty ester.

4 Claims, 1 Drawing Figure

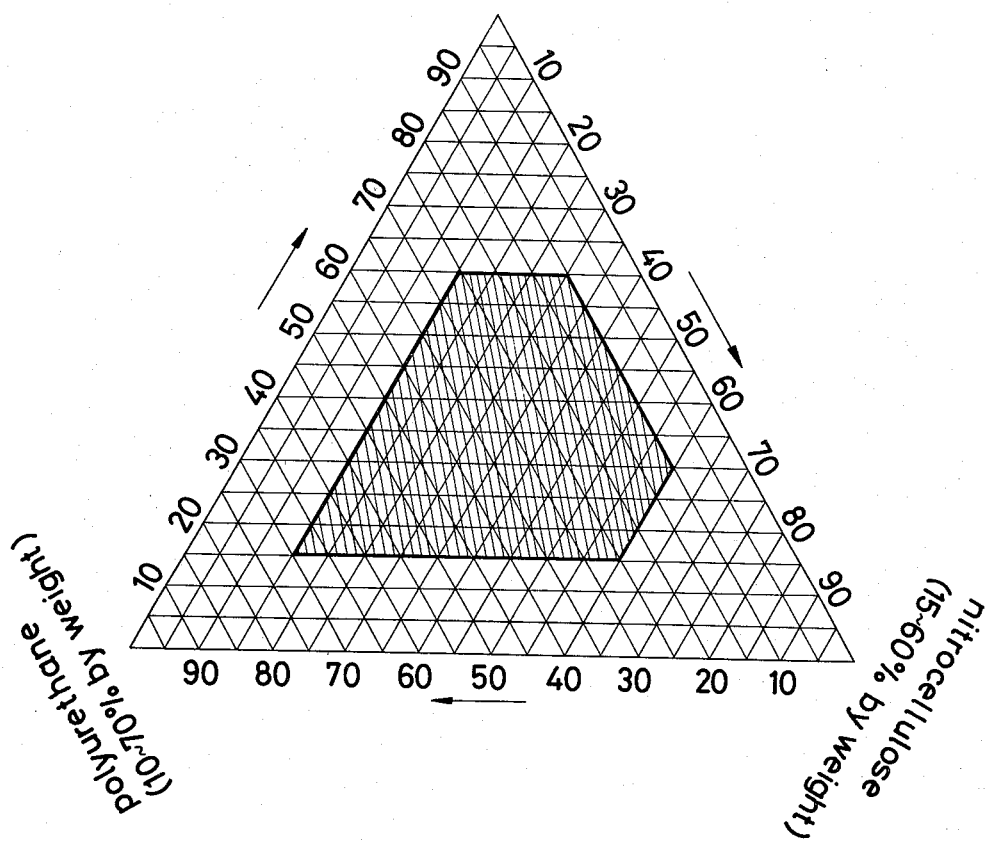

MAGNETIC RECORDING MEDIUM

BACKGROUND OF THE INVENTION

This invention relates to improvements in a magnetic recording medium, and more specifically to improvements in a back coating to be formed on the back of the base for the magnetic recording medium.

The magnetic recording medium is in extensive use in audio and video recording and also in computer and other fields. Especially, video tape cassettes (e.g., of the VHS and beta systems) have enjoyed widespread use in recent years. Consequently, intensive and earnest studies are being carried on to realize commercial production of video cassette tapes capable of recording and playing for long periods of time, in the same manner as thin audio cassette tapes have successfully been merchandised for extended recording and playing time.

For the tape performance the characteristics of the magnetic recording layer formed on one side of a tape base is, of course, a chief determinant. Also, it is to be noted that the characteristics of the back surface of the base are important considerations in use of the tape and from the standpoint of overall tape characteristics. Because of the trend towards adoption of ever thinner tape bases, forming a thin coating on the back of the tape for the reinforcement purpose has been proposed. However, among others the following matters become a problem:
1. Video S/N
2. Cinching (loosening of tape roll on quick stop)
3. Wear of back coating
4. Mutual adhesion of magnetic layer and back coatings on adjacent layers of wound tape The back coating is required to have these characteristics in a balanced way. Heretofore, adequate consideration has seldom been given to the characteristics in general, and no magnetic recording tape has been introduced yet which has a back coating with well-balanced characteristics.

In view of the above, we are proposing a magnetic recording medium having a back coating which obviates the drawbacks of the prior art magnetic recording medium and exhibits very advantageous effects. The magnetic recording medium with desirable characteristics is obtained, for example, by dispersing a nonmagnetic powder in a binder which is a mixture of a thermosetting resin, typically represented by a vinyl chloride-vinyl acetate copolymer, polyurethane, and an isocyanate compound, with or without the further addition of nitrocellulose, and then applying the whole mixture on a base to form a back coating thereon. Some other proposals of the character have also been made.

Basically, these techniques may be boiled down to a common method of forming magnetic recording layer on one side of a base and forming a back coating on the other side, the back coating material consisting of a nonmagnetic powder dispersed and mixed in a binder composed chiefly of a thermosetting resin. As compared with the ordinary magnetic recording medium free of back coating, such a back-coated one has presented a new problem in addition to those referred to above. It is jitter, a phenomenon of video signal instability caused by slight phase variations. The phenomenon is believed to be related to the smoothness of tape running.

Our investigations about the way of preventing the jitter have now revealed that the addition of a lubricant which consists of a fatty acid or a fatty ester to the back coating material is effective for achieving the end. The fatty acid or ester thus incorporated proves highly jitter-preventive without sacrificing other characteristics required of the back coating.

SUMMARY OF THE INVENTION

Thus, the present invention provides a magnetic recording medium having a magnetic recording layer on one side of the base and a back coating containing a nonmagnetic powder and a thermosetting resin on the other side of the base, characterized in that the back coating contains a fatty acid and/or a fatty ester (ester of fatty acid).

BRIEF DESCRIPTION OF THE DRAWING

The single FIGURE is a ternary composition diagram indicating the proportional ranges (in % by weight) of three components of the binder to be used.

DETAILED DESCRIPTION OF THE INVENTION

In the present invention, the tape base and magnetic recording layer do not constitute a characteristic feature and the employment of any materials conventionally in use as those constituents. Typically, the tape base may be made of polyethylene terephthalate, polyethylene naphthalate, polyimide, polyamide, or the like. The magnetic recording layer is formed by applying on the base a fine magnetic powder of iron oxide, cobalt-doped iron oxide, metallic iron, chromium oxide or the like, together with a suitable binder material.

A back coating, consisting essentially of a nonmagnetic powder dispersed and mixed in a binder including a thermosetting resin is provided on the side of the tape base opposite to the side having the magnetic recording layer.

The nonmagnetic powder is a chosen one or plurality of what are known as pigments or fillers in the art. The powder is added to adjust the surface roughness and increase the reinforcing effect of the back coating. The surface roughness of the coating has much to do with the aforementioned cinching, and by giving a proper degree of roughness to the surface the cinching phenomenon will be reduced. The roughness of the back coating surface also influences the running quality of the tape and adherability between the magnetic layer and back coatings in winding. Too rough back coating can cause output fluctuation. In order to suppress cinching and avoid output fluctuation, it is important to choose an appropriate degree of surface roughness for a given combination of back coating materials. The roughness is governed by the particle size, proportion, and dispersed condition of the nonmagnetic particles. As noted above, the nonmagnetic powder plays a key role in toughening the back coating and minimizing the wear of the back coating. For added reinforcing effect, the nonmagnetic powder may at least partly contain abrasive or other very hard powder. It may also contain some electrically conductive powder for an antistatic effect. Usable nonmagnetic powders include carbon black, graphite, $SiO_2$, $TiO_2$, $Al_2O_3$, $Cr_2O_3$, SiC, $CeO_2$, $CaCO_3$, zinc oxide, geothite $\alpha\text{-}Fe_2O_3$, talc, kaolin, $CaSO_4$, boron nitride, graphite fluoride, and molybdenum disulfide. They may be employed singly or in combination of two or more. Typically, $CaCO_3$ or carbon is used.

While the binder is composed fundamentally of a thermosetting resin, especially a vinyl chloride-vinyl acetate copolymer, it may contain other additives to improve the characteristics of the back coating. For example, as stated above, the dispersion of the nonmagnetic powder in a binder mixture consisting of vinyl chloride-vinyl acetate copolymer, polyurethane, and an isocyanate compound offers very significant improvements in preventing or reducing the tape cinching, wear of the back coating, and mutual adhesion of the magnetic and back coatings. Moreover, the addition of nitrocellulose enables the mixture to avoid practically a drop in the video S/N. An isocyanate compound causes crosslinking of the thermosetting resin and thereby contributes to the prevention of wear of the back coating. Polyurethane combines with the thermosetting resin and isocyanate compound to create a surface that will not stick to the magnetic coating on adjacent layers of the wound tape. Nitrocellulose promotes the dispersion of the nonmagnetic powder to prevent a decrease in the video S/N.

According to this invention, a fatty acid and/or a fatty ester is added as a lubricant to the binder. The lubricant thus added smoothens the tape running and effectively prevents the jitter. The fatty acid is preferably one having from 10 to 22 carbon atoms in the molecule. Examples are lauric acid, stearic acid, myristic acid, and their mixtures.

The proportions of the binder components are variable over broad ranges. Where the binder to be used is a mixture of vinyl chloride-vinyl acetate copolymer, polyurethane, and an isocyanate compound, the proportions of the vinyl chloride-vinyl acetate copolymer and polyurethane are usually such that the former accounts for 10–80% and the latter for the remainder. As for the isocyanate compound, even a very small addition will give a corresponding effect, but it is usual to add in an amount of 5–80 parts of the basis of the total resin amount of the vinyl chloride-vinyl acetate copolymer and polyurethane which is 100 parts.

Where the binder to be used is a mixture of nitrocellulose, vinyl chloride-vinyl acetate copolymer, polyurethane, and isocyanate compound, the proportions of nitrocellulose, vinyl chloride-vinyl acetate copolymer, and polyurethane are generally considered to be in the hatched region in the diagram of the attached drawing, or in the ranges specified to be 15–60 wt% nitrocellulose, 15–60 wt% vinyl chloride-vinyl acetate copolymer, and 10–70 wt% polyurethane. As for the isocyanate compound, even a very small addition will prove correspondingly effective as stated above, but it is usually added in an amount of 5–80 parts on the basis of the total resin amount which is 100 parts. The nonmagnetic powder too displays a fairly good effect when added in a very small proportion, and it can be used in a proper amount such that the binder used will attain an adequate bond. The lubricant also can be added in a very small amount to produce a lubricating effect. Usually several percent by weight on the basis of the total weight is enough, but more may be added according to the necessity. The proportion may be suitably chosen depending on the particular back coating in which it is to be incorporated.

The invention is illustrated by the following examples and comparative examples. The following five characteristics were determined or evaluated, respectively, in the manner briefly explained.

1. Video S/N

Using a commercially available video tape recorder of the VHS system, a 50% white level signal was recorded on the test tape with a recording current optimum for the reference tape, and the ratio of signal to noise in the video demodulated signal during playback was measured with Shibasoku Co.'s Video noise meter, Model 925C, as compared with that of a TDK reference tape set at zero decibel.

2. Cinching

On a commercially available VTR of the VHS system, the total length of the test tape was rapidly fed and then, in the course of quick rewinding, the tape was stopped at a point 50 meters short of the tape end, and then the tape was rewound rapidly to the last. The outward appearance of the rewound tape roll was visually observed. Each tape smoothly wound without any gap between the tape layers was rated good with a circle (O), and each tape wound with any gap or gaps between the layers was rated bad with a cross (X).

3. Wear of back coating

On a VHS-system VTR each test tape was driven for 100 runs at a temperature of 40° C. and a relative humidity of 80%, and then the interior of the cassette case was inspected for uncleanliness. If it was unclean the rating was "X" and if clean the rating was "O".

4. Mutual adhesion of magnetic layer and back coatings

Each tape was taken up on a reel for the VHS-system VTR, allowed to stand at 60° C. for 5 days, and the inter-coating sticking or non-sticking was visually evaluated. The rating was "O" where there was no adhesion at all and "X" where there was any.

5. Jitter

Using a VHS-system VTR each test tape was allowed to run 100 times at a temperature of 40° C. and a relative humidity of 80%, and the reproduced picture was visually observed for instability. When there was no aberration or instability, the rating was "O" and where there was, "X".

COMPARATIVE EXAMPLES AND EXAMPLES OF THE INVENTION

For the examples a base film roll was made by coating a 11.5µ-thick film of polyethylene terephthalate with a magnetic coating material of the composition shown in Table 1, forming a magnetic recording layer 3.5µ in thickness, and then calendering and heat-treating the magnetically coated film.

TABLE 1

| Component | Co-doped iron oxide | Nitro-cellulose | Vinyl chl.-vinyl acet.-copolymer | Polyurethane | Isocyanate compound | Fatty acid |
|---|---|---|---|---|---|---|
| Wt % | 78 | 5 | 4 | 9 | 3.5 | 0.5 |

The composition shown in Table 1 included the following components:

Nitrocellulose=manufactured by Daicel, Ltd. as "Nitrocellulose"

Vinyl chloride-vinyl acetate copolymer=manufactured by UCC under the trade name "VAGH"

Polyurethane = manufactured by Farbenfabriken Bayer AG under the trade name "Desmocoll 22"

Isocyanate compound = manufactured by Farbenfabriken Bayer AG under the trade name "Desmodur L"

Each of the back coating compositions given in Table 2 was thoroughly dispersed and mixed by a ball mill and then applied on the side of the base film opposite to the magnetically coated side and heat-treated under prescribed conditions to form a 1μ-thick back coating. The back coated film was slitted into ribbons of a predetermined width, and 340 m-long video cassette tapes for the VHS system were made. The tapes were tested by the aforesaid procedures for performance evaluation. The results are also shown in Table 2.

TABLE 2

| Exp. No. | Back coating composition (wt %) | | | | | | Test results | | | | |
|---|---|---|---|---|---|---|---|---|---|---|---|
| | Nonmagnetic powder CaCO3 | Nitrocellulose | vinyl chl.-vinyl acet.-copolymer | Polyurethane | Isocyanate compd. | Lubricant | Video S/N | Cinching | Wear resis. of back coating | Non-sticking to magnetic coating | Jitter |
| Comp. Ex. | | | | | | | | | | | |
| 1 | | | No back coating | | | | +1.5 | X | O | O | O |
| 2 | 67 | 0 | 16.5 | 16.5 | 0 | 0 | +0.5 | O | X | O | X |
| 3 | 34 | 14 | 14 | 28 | 10 | 0 | +1.5 | O | O | O | X |
| 4 | 67 | 9 | 5 | 14 | 5 | 0 | +1.5 | O | O | O | X |
| Example | | | | | | | | | | | |
| 1 | 67 | 7 | 7 | 12 | 5 | 2 | +1.3 | O | O | O | O |
| 2 | 34 | 14 | 14 | 24 | 10 | 4 | +1.4 | O | O | O | O |
| 3 | 67 | 9 | 5 | 12 | 5 | 2 | +1.4 | O | O | O | O |

Note:
components used were as follows:
CaCO3 = made by Shiraishi Calcium Co. (average particle size: 0.04μ)
Nitrocellulose = Daicel's "Nitrocellulose"
Vinyl chloride-vinyl acetate copolymer = UCC's "VAGH"
Polyurethane = Farbenfabriken Bayer's "Desmocoll 22"
Isocyanate compound = Farbenfabriken Bayer's "Desmodur L"
Lubricants:
Example 1 = lauric acid
Example 2 = 1:1 mixture of lauric acid/butyl myristate
Example 3 = butyl stearate As can be seen from Table 2, the addition of the lubricant to the back coating eliminates the jitter as observed in Comparative Examples 2 to 4. Also, Table 2 shows that the dispersion of the nonmagnetic powder in the binder consisting of vinyl chloride-vinyl acetate copolymer, nitrocellulose, polyurethane, and isocyanate compound gives a back coating excellent in arresting cinching, wear of the back coating, and adhesion to the magnetic coating, without any substantial sacrifice of the video S/N. The present invention, especially in connection with video cassette tapes, solves the problems on use of thin tapes for long recording and playing time, and constitutes a very significant contribution to the commercialization of such thin tapes.

What is claimed is:

1. A magnetic recording medium comprising a base, a magnetic recording layer formed on one side of said base, and a back coating consisting of a nonmagnetic powder dispersed in a binder and formed on the other side of said base, characterized in that said back coating contains a lubricant selected from the group consisting of a fatty acid and a fatty acid ester, and said binder consists essentially of nitrocellulose, vinyl chloride-vinyl acetate copolymer, polyurethane, and an isocyanate compound.

2. The magnetic recording medium according to claim 1, wherein said binder comprises by weight of each 15-60% nitrocellulose, 15-60% vinyl chloride-vinyl acetate copolymer, and 10-70% polyurethane; and the isocyanate compound constitutes 5-80 parts by weight per hundred parts of the total amount of the vinyl chloride-vinyl acetate copolymer plus polyurethane, and the lubricant constitutes several percent by weight of the total back coating composition.

3. The magnetic recording medium according to claim 1, wherein the lubricant is a fatty acid.

4. The magnetic recording medium according to claim 3, wherein the fatty acid is selected from the group consisting of lauric acid, stearic acid and myristic acid.

* * * * *